United States Patent [19]

Vargiu et al.

[11] 4,120,685
[45] Oct. 17, 1978

[54] PROCESS FOR THE PREPARATION OF UREA-FORMALDEHYDE CONDENSATES TO BE USED AS FERTILIZERS

[75] Inventors: Silvio Vargiu, Casatenova (Como); Giorgio Mazzoleni, Milan; Silvestro Pezzoli, Biassono (Milan), all of Italy

[73] Assignee: Societa' Italiana Resine S.I.R. S.p.A., Milan, Italy

[21] Appl. No.: 775,684

[22] Filed: Mar. 8, 1977

[51] Int. Cl.$^2$ ............................................. C05C 9/00
[52] U.S. Cl. .............................. 71/30; 71/64 DB; 260/555 R
[58] Field of Search ....................... 71/28–30, 71/64 DB; 260/555 R, 29.4 R, 553 R

[56] References Cited

U.S. PATENT DOCUMENTS 3,198,761  8/1965  O'Donnell ............................ 71/28 X

FOREIGN PATENT DOCUMENTS 875,907  8/1961  United Kingdom ....................... 71/28
869,362  5/1961  United Kingdom ....................... 71/28

OTHER PUBLICATIONS

Clark et al., New Synthetic N$_2$Fert., Ind. & Eng. Chem., July 1948, pp. 1178–1183.

*Primary Examiner*—Ferris H. Lander
*Attorney, Agent, or Firm*—Sughrue, Rothwell, Mion, Zinn and Macpeak

[57] ABSTRACT

Fertilizers with a slow and controlled release of nitrogen are obtained by condensing urea with formaldehyde in three condensation stages carried out under well-determined conditions of pH, temperature and formaldehyde/urea molar ratio and up to well-determined viscosities of the resulting product. The first stage is carried out in the presence of methanol, the second stage after addition of formic acid and the third stage after neutralization and addition of a further amount of urea. The condensation stages are followed by a terminal heat-treatment at 200°–400° C for 0.5 to 5 minutes.

12 Claims, No Drawings

PROCESS FOR THE PREPARATION OF UREA-FORMALDEHYDE CONDENSATES TO BE USED AS FERTILIZERS

The present invention concerns a process for the preparation of fertilizers with a controlled release of nitrogen, consisting of condensates of urea with formaldehyde.

The products obtained by controlled condensation of urea with formaldehyde have already been studied for their use as fertilizers.

Said products have typically a nitrogen content of the order of 38–40% and a formaldehyde/urea molar ratio of the order of 0.5:1.

The fundamental characteristic of the fertilizers under discussion consists in the capability of slowly releasing nitrogen under the action of the microorganisms of the soil and, with respect to the most common inorganic nitrogenous fertilizers, they offer the following advantages: — long lasting activity with a consequent regular and efficacious feeding of the plants. According to agronomical studies, the nitrogen contained in the urea-formaldehyde condensate is transformed into nitrate by the action of the microorganisms and said transformation may last in the soil from 6 to 12 months. In particular, the higher the formaldehyde/urea ratio, the lower is the release of the nitrificable nitrogen. — possibility of administering the fertilizer in a single application and in strong doses without dangers of burning the roots or the leaves of the plants; — absence of high concentration of salts in the soil; — absence, or at least strong reduction of the phenomena of nitrogen washing out, because a good percent (about 67%) of the urea-formaldehyde condensate is insoluble in water.

This latter characteristic is particularly important in the winter periods when the microbic flora of the soil is less active.

In other words, the insolubility of the condensate permits to create a reserve of fertilizer for the seasons in which the microbic flora is more active.

Some correlations among the characteristics of the urea-formaldehyde condensate and the corresponding nitrification time, are reported in "Agricultural and Food Chemistry", Vol. 2, No. 2, Jan. 20, 1964. These correlation which are based on rapid analyses of the condensate, are reported in the following.

Having stated before hand that by "Win" and "HWin" are indicated respectively the nitrogen percent by weight of the condensate insoluble in cold water (25° C.) and the percent insoluble in hot water (100° C.), the activity index (IA) of the condensate is expressed by the relation:

$$IA = 100 \, (Win - HWin)/Win$$

Having stated furtherly that by $N_3$ is meant the percent by weight of nitrogen of the condensate transformed into nitric nitrogen after three weeks of incubation in a standard soil and by $N_{15}$ the percent transformed after fifteen weeks, the nitrification index (IN) is expressed by the relation:

$$IN = 100 \, (N_{15} - N_3)/(100 - N_3).$$

An approximate correlation between the values of IA and IN is the following:

$$IN = 0.9 \, IA.$$

Therefore the close correlation between the nitrification index and the activity index and the possibility of their determination by the simple insolubility measurements Win and HWin, are evidenced.

Then, according to what established by the Association of Official Agricultural Chemists (AOAC), condensates of urea-formaldehyde having values of IA ranging from 48 to 58 and values of Win and HWin respectively of about 20–24 and 10–12, should be considered as optimal fertilizers for the greater part of the soils and cultures.

The values of Win and HWin are in direct relationship with the molecular weight of the urea-formaldehyde condensate and with the structure of said condensate.

As is known, the control of the structure of the urea-formaldehyde condensate and of its molecular weight is extremely difficult.

In fact, several collateral reactions occur in said condensation, especially when the operation is performed at low formaldehyde/urea molar ratios.

Consequently, it is extremely arduous to control the values of IA and therefore of IN.

Thus, for example, operating according to the conventional one stage processes, condensates having undesirably high values of IA are produced.

It has been found now that it is possible to eliminate or, at least, to reduce in a substantial way the described drawbacks, by the process of the present invention which permits to set within very restricted ranges the Win and HWin values of the urea-formaldehyde condensate and to produce fertilizers having values of IA and therefore of IN in the desired field of values.

In particular, according to the present invention fertilizers with low and controlled release of nitrogen, consisting in condensates of urea with formaldehyde, having values of IA, Win and HWin ranging from 48 to 58, from 20 to 24 and from 10 to 12 respectively, are prepared by means of a process which consists:

(a) in bringing into contact formaldehyde, urea and methanol in an aqueous reaction medium in a formaldehyde/urea molar ratio ranging from 2.0:1 to 2.5:1 and with an amount of methanol ranging from 4 to 10 moles for each 100 moles of formaldehyde and in condensing the mixture in a first condensation stage, at a pH of the aqueous reaction medium ranging from 8 to 9.5 and at a temperature ranging from 60° to 98° C., until a product with a viscosity ranging from 15 to 30 sec. as measured at 25° C. in a Ford cup No. 4 is obtained;

(b) in adding formic acid to the product obtained in (a) and in condensing the resulting aqueous mixture in a second condensation stage, at a pH ranging from 4.0 to 5.5 and at a temperature ranging from 60° to 98° C., until a product having a viscosity ranging from 35 to 45 sec. as measured at 25° C. in a Ford cup No. 4 is obtained;

(c) in neutralizing the product obtained in (b) up to a pH ranging from 6.8 to 7.5;

(d) in adding urea, to the product obtained in (c) until a formaldehyde/urea molar ratio ranging from 0.6:1 to 0.75:1 is reached and in condensing the resulting aqueous mixture in a third condensation stage, at a pH ranging from 5.7 to 6.8 and at a temperature ranging from 60° to 98° C. until a product having a viscosity ranging from 45 to 50 sec. as measured at 25° C. in a Ford cup No. 4 is obtained;

(e) in heating the product obtained in (d) at a temperature ranging from 200° to 400° C. and for a period ranging from 0.5 to 5 minutes and in recovering the resulting solid fertilizers.

Therefore, the process of the present invention is essentially based on carrying out the condensation of formaldehyde with urea in several stages performed under controlled conditions of temperature, pH and reagents ratios, on the addition of methanol at the first of said condensation stages and on the final treatment of the condensate having the twofold purpose of reaching the desired degree of condensation of urea with formaldehyde and of eliminating the water.

Besides, the best results are realized when the condensation stage (d) is carried out through several condensation steps, in series among them, such as from 2 to 10 steps and preferably from 3 to 6.

In this embodiment each step is carried out under the conditions of temperature and of pH of stage (d) and urea id added in each single step, thus maintaining decreasing values of the formaldehyde/urea molar ratio between each step and the following one, until the final values previously indicated are reached.

The fact of subdividing the third condensation stage (d) into several steps makes easier the control of the structure and of the molecular weight of the urea-formaldehyde condensate.

The preferred conditions, within which the process of the present invention is carried out are the following:

in (a) the operation is carried out at a temperature ranging from 85° to 95° C., at a pH ranging from 8 to 8.5, with a formaldehyde/urea molar ratio ranging from 2:1 to 2.2:1 and with methanol in an amount of 6-7 moles for each 100 moles of formaldehyde. Besides, the formaldehyde is fed in the form of those products known in the art as "formurea" or "urea syrup", which typically have a formaldehyde content of 59-60% by weight and a urea content of the order of 24-25% by weight. In this case said formurea is fed together with the urea, always complying with the required range of formaldehyde/urea molar ratios which has been previously indicated. Finally, the reaction times, suitable for obtaining the desired viscosities (from 15 to 30 seconds) in the discharged product, are generally of 15-50 minutes.

in (b) the operation is carried out at a temperature of from 85° to 95° C., at a pH of 5.1-5.2 and no addition of urea is effected. Formic acid is advantageously fed in aqueous solution, for example in a solution containing 10% by weight of acid. Finally, the reaction times are generally of 4-10 minutes.

in (c) the pH is brought to 7-7.3, by addition of an alkali metal hydroxide, for example sodium hydroxide in diluted aqueous solution (typically 10% by weight).

in (d) the operation is carried out at a temperature ranging from 85° to 95° C. and at a pH of 6.5-6.6 with a formaldehyde/urea molar ratio of the order of 0.7:1. As previously said, it is preferable to carry out the operation through several reaction steps and in any case the total reaction time is generally of 60-240 minutes for reaching the desired value of viscosity in the final product.

in (e) the operation is carried out at a temperature of the order of 220° C. with a short residence time under the drying conditions and typically of 1-2 minutes. It is possible to use drying techniques of the thin film or spraying type (spray-drying) with a temperature ranging from 200° to 400° C. and that as a function of the residence time of the material under the drying conditions. These techniques are well known to those skilled in the art and therefore they will not be furtherly illustrated.

The urea-formaldehyde condensate which is discharged from (d) does not yet have a degree of condensation sufficient for the purposes of the present invention and besides it contains water in amounts of the order of 3-4% by weight.

Therefore that treatment in (e) at the temperature and for the time previously indicated, which permits on one hand to obtain a solid dry product and on the other hand to raise the condensation degree of urea with formaldehyde to the desired range of values capable of imparting to the dry condensate the desired characteristics of IA, Win and HWin, is fundamental.

The values of time and of temperature in (e) are critical because, above the maximum values and below the minimum values, condensates having IA, Win and HWin values out of the desired ranges are obtained.

For the purpose of fostering condensation in (e) it is convenient to carry out the operation in the presence of acid substances or better in the presence of substances which release acid under the condition of the operation.

Therefore, the product discharged from (d) may be acidified to a pH of the order of 2-4, by addition of mineral or organic acids such as: sulfuric acid, phosphoric acid, hydrochloric acid, formic acid, acetic acid etc.

According to a preferred embodiment, ammonium salts of inorganic acids, for example ammonium sulfate, are added to the product discharged in (d). Said salts under the conditions of (e) release ammonia (which will combine with formaldehyde with formation of hexamethylenetetramine) and acid (which promotes urea condensation with formaldehyde).

The amount of these ammonium salts is usually maintained at values from 4 to 8% by weight.

The process of the present invention may be carried out either in a continuous or in a discontinuous way. In any case, it permits the obtaining of formaldehyde-urea condensates useful as fertilizers with a slow and controlled release of nitrogen, and having this set of characteristics which have been previously described.

All that will be evidenced by the following experimental examples in which the parts and the percents are intended by weight if not otherwise specified.

EXAMPLE 1 (COMPARISON)

1113 parts of urea syrup, 1588 parts of urea and 713 parts of water are charged into a reactor.

The urea syrup has a formaldehyde content equal to 59.6% and a urea content of 24.4%.

The mixture is heated at 90° C. and is condensed at a pH of 6.5-6.6 up to a viscosity equal to 45 sec. as measured at 25° C. in a Ford cup No. 4.

Then the mass is cooled and aqueous sodium hydroxide (sodium hydroxide concentration 10%), is added up to a pH of about 8.

50 parts of the resulting product are acidified to a pH of 2 with 4 ml of an aqueous solution of 42% phosphoric acid and then dried by heating 1 minute at 220° C. in a thin film.

A product in powder having the following characteristics is obtained:

Win = 18.31
HWin = 6.48
IN = 64.60

EXAMPLE 2 (COMPARISON)

1113 parts of urea syrup (equal to that of Example 1), 43.8 parts of methyl alcohol, 1588 parts of urea and 713 parts of water are charged into a reactor.

The mixture is heated at 90° C. and is condensed at a pH of 6.5–6.6 up to a viscosity of 45 sec. as measured at 25° C. in a Ford cup No. 4.

Then the mixture is cooled and 10% aqueous sodium hydroxide is added up to a pH of about 8.

50 parts of the product thus obtained are acidified to pH 2, with 4 ml of a 42% aqueous solution of phosphoric acid and finally the product is dried in 1 minute of time at 220° C. in a thin film.

A product in powder having the following characteristics is thus obtained:
Win = 24.50
HWin = 13.90
IN = 43.30

EXAMPLE 3 (COMPARISON)

1113 parts of urea syrup (equal to that of Example 1), 170.7 parts of methyl alcohol, 1588 parts of urea and 713 parts of water are charged into a reactor. The mixture is heated at 90° C. and is condensed at a pH of 6.5–6.6 up to a viscosity of 45 sec. ad measured at 25° C. in a Ford cup. No. 4.

Finally the mixture is cooled and 10% aqueous sodium hydroxide is added up to a pH of about 8.

50 parts of the product thus obtained are acidified to a pH of 2 by means of 4 ml of a 42% solution of phosphoric acid and the product is dried at 220° C. in one minute, in a thin film.

A product in powder having the following characteristics is obtained:
Win = 20.65
HWin = 7.94
IA = 61.60

EXAMPLE 4

1113 parts of urea syrup (equal to that of the first Example), 43.8 parts of methyl alcohol, 335 parts of urea and 149 parts of water are charged into a reactor.

The mixture is condensed at 85° C. for 25 minutes up to a viscosity of 25 sec. as measured at 25° C. in a Ford cup No. 4.

Then the pH of the mixture is brought to 5.1–5.2 by means of aqueous formic acid (10% formic acid) and the mixture is condensed at 96° C. up to a viscosity of 38 sec. as measured at 25° C. in a Ford cup No. 4.

The mass is neutralized up to a pH of 7–7.3, by means of a 10% aqueous solution of sodium hydroxide and 626.5 parts of urea and 282 parts of water are added.

The mixture is condensed at 90° C. and pH 6.5–6.6 up to a viscosity of 40 sec. as measured in the usual way.

Then 626.5 parts of urea and 282 parts of water are added and the mixture is condensed at 90° C. and pH 6.5–6.6 up to a viscosity of 45 sec.

Finally the mixture is cooled and brought to a pH of about 8 by means of a 10% sodium hydroxide solution. 50 parts of the product thus obtained are acidified to pH 2 by addition of 4 ml of an aqueous solution of phosphoric acid at 42% and finally the mixture is dried, in the time of 1 minute at 220° C. in a thin layer.

The product in powder thus obtained presents the following characteristics:
Win = 23.27
HWin = 11.70
IA = 49.65

EXAMPLE 5

1113 parts of urea syrup (equal to that of Example 1), 43.8 parts of methyl alcohol, 333 parts of urea and 149 parts of water are charged into a reactor.

The mixture is condensed at 85° C. for 25 minutes up to a viscosity of 25 sec. as measured at 25° C. in a Ford cup No. 4.

Then the pH is adjusted to 5.1–5.2 with 10% aqueous formic acid and the mixture is condensed at 96° C. up to a viscosity of 40 sec. as measured at 25° C. in a Ford cup No. 4.

The mass is neutralized to a pH 7–7.3, by addition of a 10% aqueous solution of sodium hydroxide and 92 parts of urea and 41 parts of water are added.

The mixture is condensed again at 90° C. and at a pH 6.5–6.6 up to a viscosity of 45 sec. a measured in the usual way.

657 parts of urea and 266 parts of water are added and the mixture is condensed at 90° C. and pH 6.5–6.6 up to a viscosity of 50″.

505 parts of urea and 229 parts of water are added and the mixture is condensed at 90° C. and pH 6.5 up to a viscosity of 50 sec.

Finally the mixture is cooled and brought to a pH of about 8 with an aqueous solution of sodium hydroxide at 10%.

50 parts of the thus obtained product are acidified to a pH 2 with 4 ml of an aqueous solution of phosphoric acid at 42% and finally the product is dried in 1 minute at 220° C. in a thin film.

The product in powder thus obtained has the following characteristics:
Win = 23.16
HWin = 10.81
IA = 53.52

EXAMPLE 6 (COMPARISON)

1113 parts of urea syrup (equal to that of Example 1), 333 parts of urea and 149 parts of water are charged into a reactor.

The mixture is heated at 85° C. for 25 minutes.

The pH is adjusted to 5.1–5.2 with 10% aqueous formic acid and the mixture is condensed at 90° C. up to a viscosity of 40 sec. as measured at 25° C. in a Ford cup No. 4.

The mixture is neutralized at pH 7–7.3 with aqueous sodium hydroxide at 10% and 92 parts of urea and 41 parts of water are added and the mixture is condensed always at 90° C. and pH 6.5–6.6 up to a viscosity of 105 sec. as measured in the usual way.

565 parts of urea and 255 parts of water are added and the mixture is condensed at 90° C. and pH 6:5 up to a viscosity of 50 sec.

505 parts of urea and 229 parts of water are added and the mixture is condensed at 90° C. and pH 6.5 up to a viscosity of 50 sec.

Finally the mixture is cooled and brought to a pH of about 8 by addition of aqueous sodium hydroxide at 10%.

50 parts of the product thus obtained are acidified at a pH of about 2 with 4 ml of an aqueous solution of phosphoric acid at 42% and the product is dried in one minute at 220° C. in a thin film.

The product in powder thus obtained presents the following characteristics:
Win = 18.36

HWin = 7.40
IA = 59.69

EXAMPLE 7 (COMPARISON)

1113 parts of urea syrup (equal to that of Example 1), 170,7 parts of methyl alcohol, 333 parts of urea and 149 parts of water are charged into a reactor.

The mixture is heated at 85° C. for 25 minutes.

The pH is adjusted to 5.1–5.2 with an aqueous solution of formic acid at 10% and the mixture is condensed at 96° C. up to a viscosity of 40 sec. as measured at 25° C. in a Ford cup No. 4.

The mixture is neutralized to pH 7–7.3 with 10% aqueous sodium hydroxide and 92 parts of urea and 41 parts of water are added and the mixture is condensed at 90° C. and pH 6–6.5, up to a viscosity of 45 sec. as measured in the usual way.

92 parts of urea and 41 parts of water are added and the mixture is condensed always at 90° C. and pH 6.5–6.6 up to a viscosity of 105 sec.

565 parts of urea and 229 parts of water are added and the mixture is condensed at 90° C. and pH 6.5 up to a viscosity of 50 sec.

505 parts of urea and 229 parts of water are added and the mixture is condensed at 90° C. and a pH 6.5 up to a viscosity of 50 sec.

Finally the mixture is cooled and the pH brought to about 8 with 10% aqueous sodium hydroxyde.

50 parts of the product thus obtained are acidified to pH 2, by addition of 4 ml of a 42% aqueous phosphoric acid and the mixture is dried in one minute at 220° C. in thin film.

The product in powder, thus obtained presents the following characteristics:

Win = 16.92
HWin = 7.50
IA = 55.62

What we claim is:

1. A process for the preparation of fertilizers with a slow and controlled release of nitrogen, consisting of condensates of urea with formaldehyde, having values of IA, Win and HWin (as hereinbefore defined) ranging from 48 to 58, from 20 to 24 and from 10 to 12 respectively, which comprises:
    (a) bringing into contact formaldehyde, urea and methanol in an aqueous reaction medium in a formaldehyde/urea molar ratio ranging from 2.0:1 to 2.5:1 and with an amount of methanol ranging from 4 to 10 moles for each 100 moles of formaldehyde and condensing the resulting mixture in a first condensation stage, at a pH of the aqueous reaction medium ranging from 8 to 9.5 and at a temperature of 60 to 98° C., until a product having a viscosity from 15 to 30 sec. as measured at 25° C. in a Ford cup No. 4 is obtained;
    (b) adding formic acid to the product obtained in (a) and condensing the resulting aqueous mixture in a second condensation stage, at a pH ranging from 4.0 to 5.5 and a temperature ranging from 60° to 98° C., until a product with a viscosity ranging from 35 to 45 sec. as measured at 25° C. in a Ford cup No. 4 is obtained;
    (c) neutralizing the product obtained in (b) up to a pH ranging from 6.8 to 7.5;
    (d) adding urea to the product obtained in (c) thereby to bring the formaldehyde/urea molar ratio to a value of from 0.6:1 to 0.75:1 and condensing the resulting aqueous mixture in a third condensation stage at a pH ranging from 5.7 to 6.8 and at a temperature ranging from 60° to 98° C., until a product with a viscosity ranging from 45 to 50 sec. as measured at 25° C. in a Ford cup No. 4 is obtained;
    (e) heating the product obtained in (d) at a temperature ranging from 200° to 400° C. for a time ranging from 0.5 to 5 minutes and recovering the resulting solid fertilizer.

2. The process of claim 1, wherein the first, second and third condensation stages are carried out at a temperature ranging from 85° to 95° C.

3. The process of claim 1, wherein the first condensation stage is carried out at a pH ranging from 8 to 8.5, the second condensation stage at a pH ranging from 5.1 to 5.2 and the third condensation stage at a pH ranging from 6.5 to 6.6.

4. The process of claim 1, wherein in stage (a) the formaldehyde/urea molar ratio is of about 2:1 to 2.2:1 and the amount of methanol is of about 6 to 7 moles for each 100 moles of formaldehyde.

5. The process of claim 1, wherein said product obtained in (b) is neutralized by adding an aqueous solution of sodium hydroxide in an amount such as to bring the pH to a value of from 7 to 7.3.

6. The process of claim 1, wherein in (d) the formaldehyde/urea molar ratio is of the order of 0.7:1.

7. The process of claim 1, wherein stage (d) is carried out in 2 to 10 condensation steps in series, urea being added in each step and decreasing values of the formaldehyde/urea molar ratio being maintained between each step and the subsequent one.

8. The process of claim 1, wherein stage (e) is carried out at a temperature of about 220° C. for a time of about 1 to 2 minutes.

9. The process of claim 1, wherein stage (e) is carried out by the spray drying or thin film drying method.

10. The process of claim 1, wherein said product obtained in (d) is previously acidified to a pH of about 2 to 4 prior to the heat-treatment of stage (e).

11. The process of claim 1, wherein said product obtained in (d) is admixed with a substance capable of releasing acid under the conditions of stage (e) prior to said stage (e).

12. The process of claim 11, wherein said substance is an ammonium salt of an inorganic acid.

* * * * *